April 5, 1949.  A. T. SMITH  2,466,496
OUTDOOR COOKER
Filed May 21, 1945
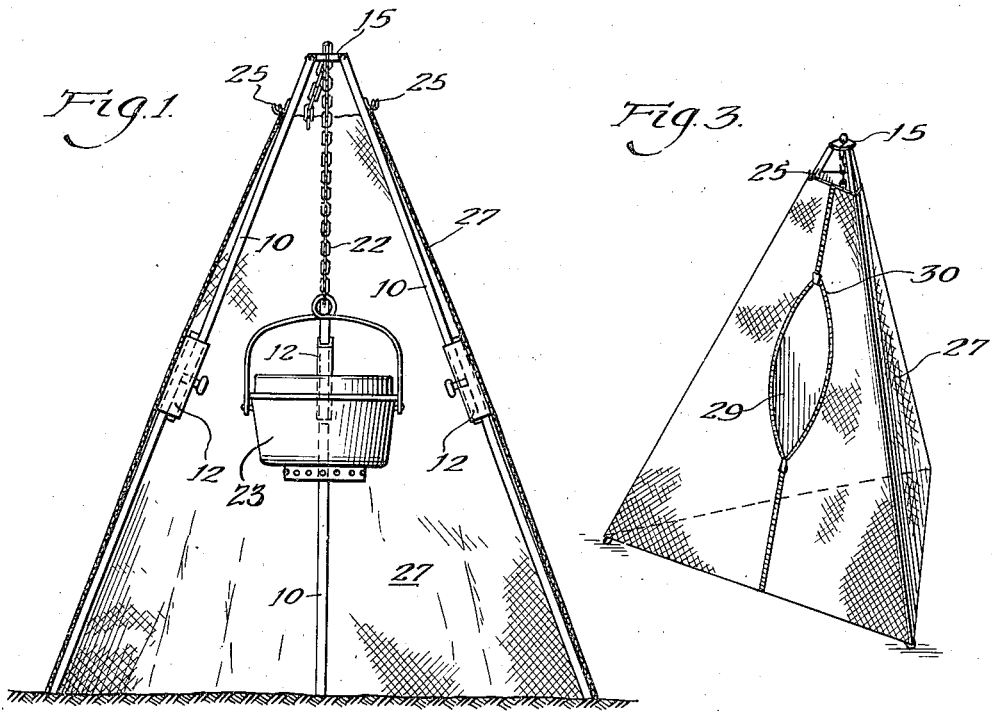
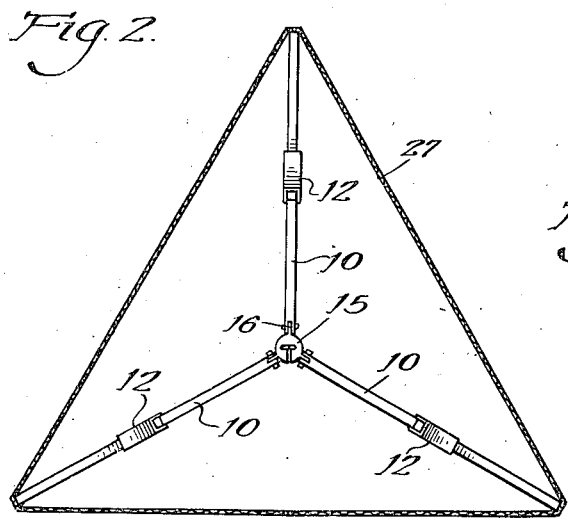
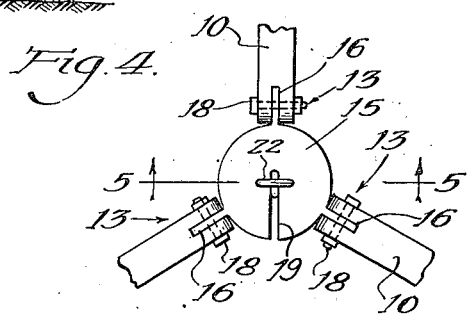
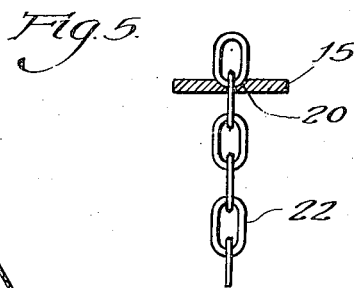
Inventor:
Alva T. Smith
By: David A. Fox
Attorney Patented Apr. 5, 1949

2,466,496

UNITED STATES PATENT OFFICE 2,466,496

OUTDOOR COOKER

Alva T. Smith, Milwaukee, Wis.

Application May 21, 1945, Serial No. 594,983

2 Claims. (Cl. 135—1)

This invention relates to outdoor cookers and more particularly to a support for an outdoor cooker.

In outdoor cooking it has been customary to support the cooking utensil from a tripod made from branches cut from trees and usually tied together at the upper ends with cord. A cord or rope then supports the cooking utensil above the flame.

With the above arrangement it is very inconvenient to change the height of the utensil above the flame. Another disadvantage of this old arrangement is that the tripod may collapse due to faulty securing of the upper end of the tripod, or the rope supporting the utensil may give way dropping the utensil into the fire.

Furthermore, in camp cooking, insects and dirt from the atmosphere drop into the food while it is cooking thus contaminating it.

One object of the present invention is to provide a support for cooking utensils which will prevent flying insects from contaminating the food.

Another object is to provide a support for cooking utensils which will keep the food therein clean.

A further object is to provide a tripod which will securely support a cooking utensil.

Other objects will become apparent upon considering the following specification, which, when taken in conjunction with the accompanying drawings, illustrate one form of the invention.

In one aspect the invention comprises a plurality of upwardly and inwardly sloping props, a connector at the upper end of said props, a link chain adapted to support a cooking utensil, and means to secure the chain in the connector in fixed position.

In another aspect the invention comprises a frame including a plurality of upwardly and inwardly sloping props, means to join and retain the upper ends of said props, a net cover for said frame and means to open a portion of said cover to gain access to the interior.

In the drawings:

Fig. 1 is a vertical section through the frame showing the cooking utensil in place;

Fig. 2 is a top view of the frame;

Fig. 3 is a perspective view of the frame and cover;

Fig. 4 is a detail of the connector plate and is a top plan view thereof; and

Fig. 5 is a cross-section on the line 5—5 of Fig. 4.

In the drawings, the frame is formed of a plurality of poles 10, of which there are preferably three, each of which may be extensible, as shown at 12, to vary the length and to facilitate transporting. The poles 10 are joined at their upper ends through hinge joints 13 to a connector plate 15.

The connector plate 15 is formed with ears 16 (Fig. 4) which are received in slots in the poles and are pivotally connected thereto through bolts 18, which form the hinge connection 13, above referred to.

The connector plate 15 has a slot 19 cut therethrough and extending to a point just past the center of the plate. The slot 19 intersects a transverse groove 20 (Fig. 5) in the upper surface of the plate 15. The slot 19 is of sufficient width to accommodate a link of a chain 22, supporting the cooking utensil 23, while the groove 20 receives and retains the next higher link of the chain in position on the plate 15. Thus, in case the connector plate tilts, the chain will not fall out of the slot 19.

The poles 10 may have hooks 25 formed thereon adjacent the upper ends thereof, which hooks receive and retain the upper end of a tripod cover 27. The cover 27 is made of porous material, such as netting, which has preferably been fireproofed, or made fire-resistant by any well known method, and treated with $\alpha,\alpha$-di(p-chlorophenyl)-$\beta,\beta,\beta$-trichloroethane, or insect repelling substance.

One side of the cover is provided with an opening 29, which may be closed by a zipper 30. The zipper, preferably, is of the double type, which has runners which open from the center in both directions, so that the cover can be opened a minimum amount at any point to permit examination of the food in the utensil 23.

The utensil 23 may thus be suspended securely from the tripod and the food cooked therein without danger of contamination from dirt or insects.

It is to be understood that the form of the invention herein shown and described is to be taken merely as a preferred embodiment of the same and that various changes in size, shape, and arrangement of parts may be resorted to without departing from the spirit of the invention or the scope of the subjoined claims.

That which is claimed as new and is desired to be secured by Letters Patent is:

1. In a device of the character described, a plurality of supports, a chain adapted to hold a cooking utensil, a plate adapted to support the chain, said plate having radially extending vertical ears the same being received between and pivotally connected to closely fitting slotted ends of said supports to form laterally stable pivotal connections therewith, said plate having a slot therethrough and extending from one edge thereof inwardly to receive a link of said chain, and a groove extending transversely of said slot to receive and retain a link of said chain.

2. In an insect barring enclosure and support for an outdoor cooking utensil the combination comprising an open-weave textile envelope adapted to afford free passage of air, a rigid supporting frame therefor, means cooperating with said frame for suspending a utensil within said envelope, an opening in the form of an upwardly extending slit in one side of said envelope, slide fastener margin members on each edge of said slit, a first slide fastener rider slideably mounted on said margin members adapted to cause an opening of said slit by downward movement and a second slide fastener rider slideably mounted on said margin members above said first named rider adapted to cause an opening of said slit by upward movement.

ALVA T. SMITH.

REFERENCES CITED

The following references are of record in the file of this patent:

UNITED STATES PATENTS

| Number | Name | Date |
|---|---|---|
| 35,032 | Morgan et al. | Apr. 22, 1862 |
| 852,623 | Dofh | May 7, 1907 |
| 955,140 | Cronk | Apr. 19, 1910 |
| 1,322,650 | Sundback | Nov. 25, 1919 |
| 1,408,900 | Miller | Mar. 7, 1922 |
| 1,732,878 | Collender | Oct. 22, 1929 |
| 1,806,454 | Goudeau | May 19, 1931 |
| 1,995,489 | Valasek | Mar. 26, 1935 |
| 2,069,479 | Pluth | Feb. 2, 1937 |

FOREIGN PATENTS

| Number | Country | Date |
|---|---|---|
| 12,666 | Great Britain | Aug. 29, 1891 |
| 55,369 | Germany | Feb. 19, 1891 |